Sept. 9, 1941.      H. H. BEVERAGE      2,255,374

SYSTEM FOR NOISE REDUCTION IN AMPLIFIERS

Filed Jan. 27, 1939

INVENTOR
HAROLD H. BEVERAGE
BY
ATTORNEY

Patented Sept. 9, 1941

2,255,374

UNITED STATES PATENT OFFICE 2,255,374

SYSTEM FOR NOISE REDUCTION IN AMPLIFIERS

Harold H. Beverage, Riverhead, N. Y., assignor to Radio Corporation of America, a corporation of Delaware Application January 27, 1939, Serial No. 253,101

4 Claims. (Cl. 250—20)

This invention relates to electron discharge tube amplifiers and more particularly to means for reducing the noises inherent in such amplifiers.

It is known that there are a number of sources of noise in amplifiers. These noises become more and more objectionable as the ultra-high frequency spectrum is utilized. The major sources of noises in amplifiers may be grouped under the following headings:

1. *Shot effect in plate circuit.*—Same for all frequencies, proportional to the square root of the plate current for a given tube.
2. *Thermal agitation.*—Same for all frequencies, proportional to the square root of the input resistance, and proportional to the square root of the band width.
3. *Grid noise.*—Increases proportional to frequency and is proportional to the input resistance and to the square root of the band width.

It is an object of my invention to provide means in an amplifier for minimizing the inherent noises.

It is a further object of my invention to provide circuit arrangements whereby the ratio of noise to useful signal is maintained at a minimum.

Figure 1:
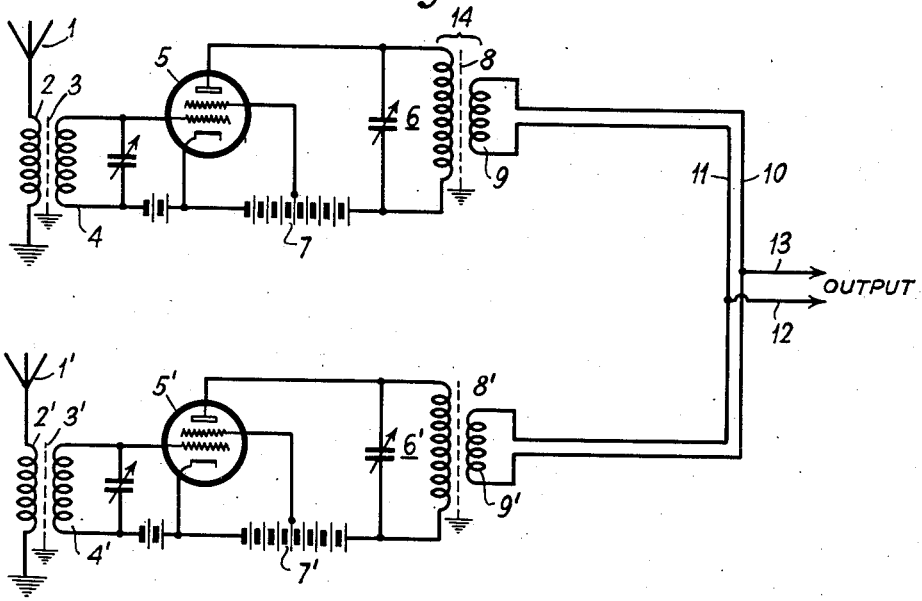
Figure 2:
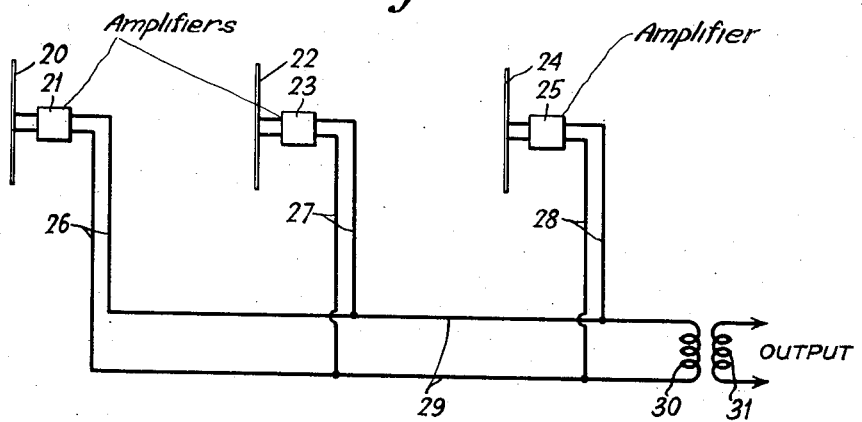

Other objects and advantages of my invention will be clarified in the description to follow wherein reference is made to the accompanying drawing, in which Figure 1 shows a combination of receiving circuits according to a well known diversity receiving system in which antennas are located at different points for so-called "broadside" reception; and Fig. 2 shows another combination of receiving circuits in which the antenna array is made according to the "end-on" plan.

Referring first to Fig. 1, I show therein one receiving system having an antenna 1, an antenna coil 2 which is part of a radio frequency transformer whose secondary is shown as the inductance of a tuned circuit 4. Between the primary and secondary of this transformer is a grounded shield 3. The tuned circuit 4 is part of the input circuit for a screen grid tube 5. The output circuit 6 of this tube is also tuned by means of an adjustable capacitor and an inductance which forms the primary of a transformer 14. The secondary 9 of this transformer is connected to leads 10 and 11. A grounded electrostatic shield 8 intervenes between the primary and secondary of the transformer 12.

For a given tube, such as 5, the shot effect noise is proportional to the plate current flowing through circuit 6 and through the plate of the tube. The thermal agitation noise occurs in the tuned input circuit 4 as well as in the plate circuit 6. However, since the thermal agitation noises in the grid circuit 4 are amplified, the major source of thermal agitation comes from circuit 4 and the antenna circuit 1 ahead of the input circuit. The grid noise occurs in the grid circuit of tube 5 and is apparently caused by the motion of the electrons in the vicinity of the grid. At low frequencies the shot effect and thermal agitation noises are predominant, while at very high frequencies the grid noise becomes a very large factor and is sometimes the major source of noise.

In the prior art these noises have been reduced as much as possible by proper design of the circuits and the tubes themselves. However, there is a limit beyond which it is not practical to go and at the very high frequencies the sensitivity of an amplifier is strictly limited by the noises inherent in the tube and the circuit. It is the purpose of my invention to show means for further reducing these noises by using a multiplicity of amplifier tubes connected in such a manner that the output energy adds in phase on the desired signal.

The equipment described thus far is a conventional one stage high frequency amplifier. Assuming that a weak signal is being received, the output of this amplifier consists of a signal S plus thermal agitation noise, plate noise, and grid noise, which we may call G. Now, if a similar amplifier is connected to a similar antenna 1', the output of the second amplifier also consists of a signal S' and a similar array of noises G'. The second amplifier is also connected to the transmission lines 10 and 11 through the coupling coil 9'. The output leads 12 and 13 are connected half-way between the amplifiers in such a manner that the signal from the two amplifiers add in phase because the length of the lines 10 and 11 from amplifiers 9 and 9' are equal at the point where the output leads 12 and 13 are connected.

From the above description it will be obvious that the signals S and S' will add in phase giving an output of twice the amplitude of the output from one amplifier alone. On the other hand, the noises G and G' from the two amplifiers are quite random in their phase relations since the sources of noise are entirely separate and independent in the two tubes. Therefore, the noise energies add to double the energy, or in other words, to produce a voltage proportional to $\sqrt{2G}$. Consequently, if we consider that the signal to noise ratio in the first tube is represented by S/G, the output of the two amplifiers combined in phase is $$\frac{2S}{\sqrt{2G}} = \frac{\sqrt{2}S}{G} = 1.41\frac{S}{G}$$

From the above relations it is obvious that with the two-tube arrangement of Fig. 1 we have obtained an improvement in the ratio of signal to noise equal to $\sqrt{2}$ or 1.41.

By similar reasoning it will be noted that, in general, by the use of my invention, it is possible to make an improvement which is proportional to the $\sqrt{N}$ wherein N is the number of amplifier tubes in the system. It should be noted that this improvement is obtained on all three types of noises which have been enumerated, since each of them are random in the separate circuits, whereas the signals are in phase.

In Fig. 2 I have shown a similar arrangement applied to an "end-on" antenna array. In this figure the signal is assumed to be travelling in such a direction that it successively reaches antennas 20, 22 and 24. These antennas are associated with amplifiers 21, 23 and 25 and the output of these amplifiers is connected to a transmission line 29 through connections 26, 27 and 28 respectively. Due to the finite time which is required for the wave in space to travel from antenna 20 to 22, the phase of the signal in antenna 22 will lag behind that in antenna 20 by an amount depending upon the distance between the antennas in proportion to the wave length. However, if the output energies from the two antennas travel in the transmission line 29 with the velocity of light, it is obvious that the energy arriving from amplifier 21 will reach the junction point of connectors 27 at the same instant that the signal energy arrives from antenna 22 so that the signals will add in phase.

While I have shown separate batteries on each amplifier tube, this is for the purpose of simplifying the drawing. In practice it would be preferable to use common batteries for all amplifier tubes. The batteries may be located in any convenient place, from which the battery voltages are connected to the several amplifier tubes over separate cables, or even over the radio frequency transmission line itself by using suitable filters to separate the D. C. and high frequency voltages by means known to the art. Suitable by-pass condensers and chokes should be used at each amplifier tube to keep the high frequencies out of the D. C. circuits, in any event.

It is obvious that the elements of the antenna array should be close enough together to avoid selective fading and the diversity effect. Otherwise the signal energies will not add in phase at all times and much of the advantage of this invention may be lost. On very high frequencies, say, in the frequency spectrum above 30 megacycles, this difficulty is not ordinarily encountered, since there is rarely any sky wave. On the other hand, the antenna elements should not be so close together that strong electrical coupling exists between the elements, otherwise some of the noises appearing in the grid circuits of the individual tubes may be transferred into the grid circuits of other tubes through the mutual coupling between the antenna elements.

While I have shown a simple amplifier circuit combined through transmission lines, it is obvious that other means known to the art may be used for combining the signal energies from the several amplifiers in phase; for example, artificial lines may be substituted for the real lines shown in my invention. Furthermore, while I have shown only one tube per amplifier, it is obvious that I could use as many tubes as desired at each point before combining the output energies. Since the phase of the signal at the amplifier outputs may be changed to some extent by the adjustment of the tuned circuits, the circuits should be adjusted very carefully for identical phase outputs or else artificial means, such as artificial lines which are well known to the art, should be used for correcting any phase differences which may exist.

I claim:

1. An arrangement for increasing the signal-to-noise ratio of high frequency output energy from an electron discharge tube amplifying system, comprising a plurality of geographically spaced antennae for collecting the signaling energy, a preliminary amplifier separately connected to each antenna respectively, and transmission lines leading from each preliminary amplifier to the input side of said amplifying system, said lines having suitably proportioned lengths such that they constitute means for adding the amplified signaling energy components in phase, and for causing the noise components inherent in the tubes of said preliminary amplifiers to be added at random phase.

2. An arrangement according to claim 1 and including means for causing the random phase addition of the noise components to be such that the signal-to-noise ratio improvement is proportional to the square root of the number of said separate antennae.

3. In an amplifying system, apparatus for increasing the signal-to-noise ratio of output energy which comprises a plurality of separate antenna arrays, electron discharge tube amplifiers each having an input circuit coupled to a respective one of said antenna arrays, an output circuit for each amplifier, means including transmission lines of predetermined lengths for combining the high frequency signal components of output energies from said amplifiers in phase, said means being operative in dependence upon the relative lengths of said amplifier output circuits and upon the relative arrival moments of high frequency signal energy at respectively different ones of said antenna arrays, and means for causing the noise components inherent in the tubes of said amplifying system to be added at random phase, the last said means being characterized by a suitable choice of electrical lengths of the respective amplifier output circuits where said lengths depend upon the relative arrival moments of high frequency signal energy at respectively different ones of said antenna arrays.

4. In a system for improving the signal-to-noise ratio of an electron discharge tube circuit arrangement, a plurality of high frequency amplifiers, appropriate geographically spaced signal energy collectors disposed along a line of propagation of a high frequency signal wave and each connected with one of said amplifiers respectively, means including a combining circuit for adding the high frequency output energies from said amplifiers in phase, said means being characterized by a suitable proportioning of the conductor lengths in said combining circuit with respect to the distances between said energy collectors and with respect to the speeds of propagation of said energy in air and through metallic conductors respectively, such that co-phasal summation of said output energies is inherent, and means for causing the noise components of said output energies which are attributable to "shot-effect" and to the operational characteristics of the tubes in said amplifiers to be added in random phase.

HAROLD H. BEVERAGE.